US008224900B2

(12) United States Patent
Dutta et al.

(10) Patent No.: US 8,224,900 B2
(45) Date of Patent: Jul. 17, 2012

(54) NETWORK-AWARE COMMUNICATIONS

(75) Inventors: Arijit Dutta, Bopodi (IN); Harpreet Singh Walia, Bangalore (IN)

(73) Assignee: Novell, Inc., Provo, UT (US)

( * ) Notice: Subject to any disclaimer, the term of this patent is extended or adjusted under 35 U.S.C. 154(b) by 189 days.

(21) Appl. No.: 12/367,960

(22) Filed: Feb. 9, 2009

(65) Prior Publication Data

US 2010/0205251 A1 Aug. 12, 2010

(51) Int. Cl.
*G06F 15/16* (2006.01)
(52) U.S. Cl. ........ 709/204; 709/206; 709/207; 709/223; 370/352; 715/700; 715/753
(58) Field of Classification Search .......... 709/204–207, 709/223; 370/352; 715/700
See application file for complete search history.

(56) References Cited

U.S. PATENT DOCUMENTS

| | | | |
|---|---|---|---|
| 7,139,800 B2 * | 11/2006 | Bellotti et al. ................ 709/206 |
| 7,139,806 B2 * | 11/2006 | Hayes et al. ................... 709/207 |
| 7,266,583 B2 * | 9/2007 | Fitzpatrick et al. ........... 709/205 |
| 7,318,061 B2 * | 1/2008 | Rothschild ............................ 1/1 |
| 7,447,165 B1 * | 11/2008 | Sylvain ......................... 370/254 |
| 7,577,150 B2 * | 8/2009 | Poustchi et al. ............ 370/395.3 |
| 7,826,830 B1 * | 11/2010 | Patel et al. .................. 455/414.1 |
| 7,886,033 B2 * | 2/2011 | Hopmann et al. ............ 709/223 |
| 7,921,368 B2 * | 4/2011 | Moody et al. ................ 715/751 |
| 7,969,959 B2 * | 6/2011 | Dabbs et al. ................. 370/349 |
| 8,018,873 B1 * | 9/2011 | Kompella ..................... 370/254 |
| 2002/0024947 A1 * | 2/2002 | Luzzatti et al. .............. 370/352 |
| 2002/0055997 A1 * | 5/2002 | Pinnell ......................... 709/224 |
| 2004/0162882 A1 | 8/2004 | Mora |
| 2005/0117525 A1 * | 6/2005 | Poustchi et al. .............. 370/254 |
| 2006/0133392 A1 * | 6/2006 | Ajitomi et al. ................ 370/401 |
| 2006/0239441 A1 * | 10/2006 | Yang et al. ................ 379/265.11 |
| 2007/0011230 A1 * | 1/2007 | Clech et al. .................. 709/204 |
| 2007/0078986 A1 * | 4/2007 | Ethier et al. ................. 709/227 |
| 2007/0129112 A1 * | 6/2007 | Tarn ............................ 455/566 |
| 2007/0165819 A1 * | 7/2007 | Blagsvedt et al. ....... 379/201.12 |
| 2007/0168433 A1 * | 7/2007 | Morgan ........................ 709/206 |
| 2007/0233798 A1 * | 10/2007 | Kelley et al. ................. 709/206 |
| 2007/0288621 A1 * | 12/2007 | Gundu et al. ................. 709/223 |
| 2008/0168348 A1 * | 7/2008 | Bergstrom et al. ........... 715/700 |
| 2009/0113304 A1 * | 4/2009 | Mercier et al. ............... 715/719 |
| 2009/0210802 A1 * | 8/2009 | Hawkins et al. ............. 715/753 |
| 2010/0080364 A1 * | 4/2010 | Davis ........................ 379/88.22 |
| 2011/0004673 A1 * | 1/2011 | Kitamura ..................... 709/220 |

OTHER PUBLICATIONS

Whelpton, Matthew, "3.2.1.1 Dynamic Location-Specific Contact List and Chat", http://moodle.org/mod/forum/discuss.php?d=41186, (Mar. 8, 2006).

* cited by examiner

*Primary Examiner* — Wing Chan
*Assistant Examiner* — Razu Miah
(74) *Attorney, Agent, or Firm* — Schwegman, Lundberg & Woessner, P.C.

(57) ABSTRACT

Apparatus, systems, and methods may operate to detect a device connecting to a network, determine the identity of the network, and publish a status indication to at least one of a list of active contacts or a list of inactive contacts. The list of active contacts may be selected from an original list of contacts, based on the identity of the network and a personal rule set associated with a user of the device. The list of inactive contacts may be included in the original list and not included in the list of active contacts. Additional apparatus, systems, and methods are disclosed.

26 Claims, 3 Drawing Sheets

NETWORK-AWARE COMMUNICATIONS

BACKGROUND

A variety of devices maintained by a user, such as laptop computers, smart phones, and personal digital assistants (PDAs), can operate to communicate with other devices using applications, such as email and Instant Messenger (IM) applications. The information may be transmitted to and received from the other devices using addresses identified in a contact list. While some development effort has been focused on various ways of adjusting membership in a user's contact list, this capability does not take full advantage of various aspects of the user's behavior that can be used to increase user productivity.

SUMMARY

In various embodiments, apparatus, systems, and methods that support network-aware communications are provided. Thus, in some embodiments, network-aware communication is enabled by detecting a device connecting to a network, determining the identity of the network, and publishing a status indication to at least one of a list of active contacts or a list of inactive contacts, based on the identity of the network and a personal rule set associated with the user of the device. For example, the status indication may comprise off-line, busy, at home, at work, etc. In many embodiments, this type of operation can be used to automatically and selectively communicate the user's status to various groups in a contact list. Additional embodiments are described, and along with the foregoing examples, will be set forth in detail below.

DETAILED DESCRIPTION

Figure 1:
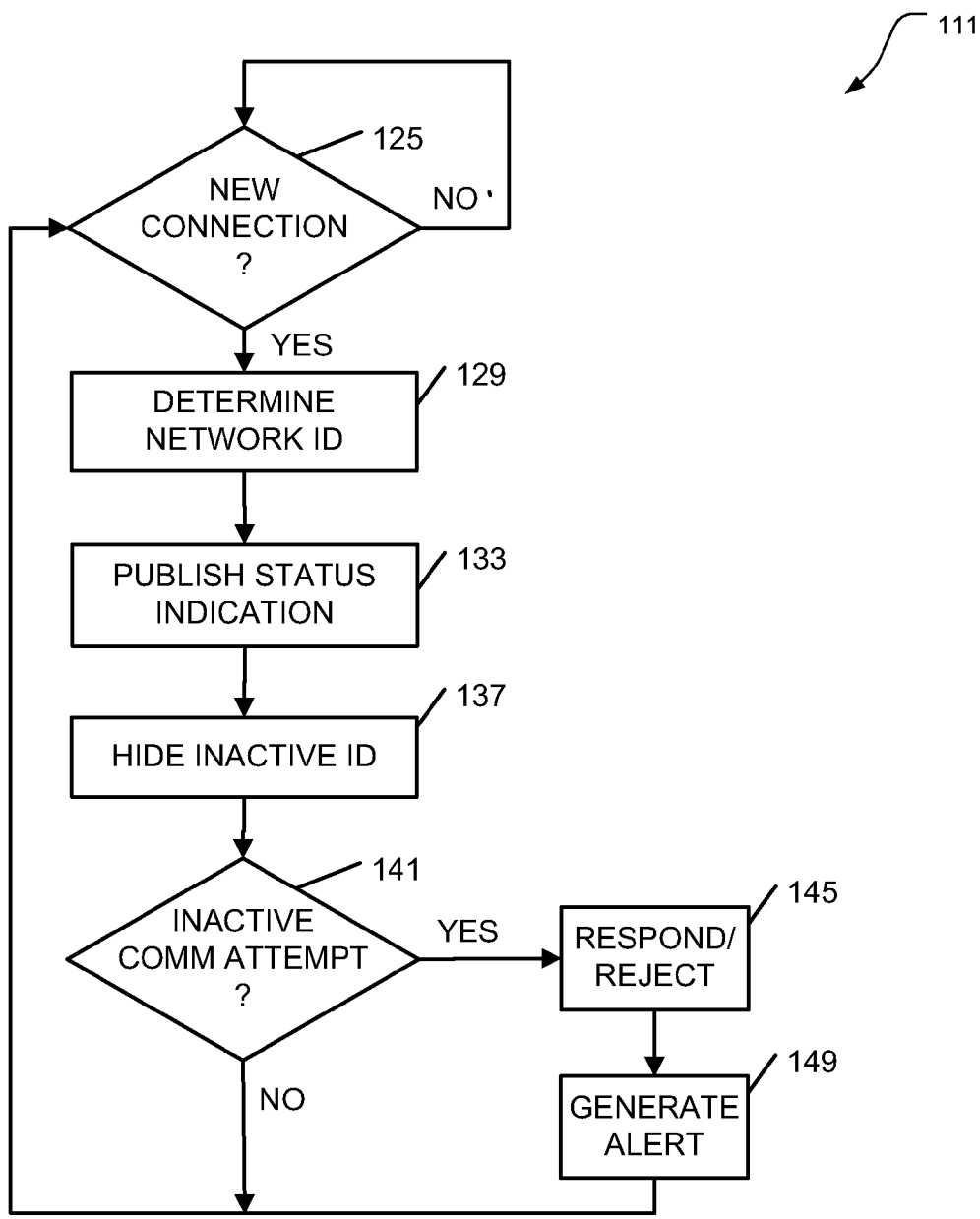
FIG. 1 is a flow diagram illustrating network-aware communication methods according to various embodiments of the invention.

Some of the challenges described above may be addressed by dividing an original list of contacts accessed by a communications device into two groups: active contacts and inactive contacts. Whenever the device makes a new network connection, the contact list can be searched for contacts which have been selectively designated as active contact with respect to the identified network. These contacts, which have been associated with the new network in some way, are designated as "active contacts." All remaining contacts in the original list which have not been so designated are determined to be "inactive contacts."

Among the many benefits that arise by dividing the original contact list in this way are the following: the device may operate to publish a status message to the active or inactive groups, perhaps in response to connecting to the new network; and the device may operate to hide the members of the inactive contact list group from the user —so that the user is only able to view active contacts while connected to the identified network.

For example, an IM application that implements this mechanism may operate to provide a network-aware contact list to the user, and the user's presence can be published to sub-groups of the original contact list based on identified network connections even to those (inactive) contacts which are no longer visible to the user. More specifically, a user in an office may only want to see contacts who have been categorized as office co-workers (e.g., those that are listed as active contacts when the device is connected to the office intranet). By publishing different status messages to the active and inactive lists, this same user may appear to be "online" to the office co-workers, and off-line to everyone else in the original contact list.

Various embodiments may use the underlying operating system (OS) of the device to set a flag, or provide a trigger/interrupt when a new network connection arises. The trigger may occur, for example, when the device is first turned on, and a network connection is made, or when the device switches from a connection with one network to a connection with another network.

The device may also operate to query the current active network connection to determine the network identity. Thus, during application start-up, the device, or an application running on the device, can query the OS to determine which network connection has been made. Based on identifying the network, the list of active contacts can be composed —as a subset of an original list of contacts. Those contacts in the original list that are not included in the active list of contacts are included in the list of inactive contacts by default.

When two network connections exist at the same time, personal rule sets configured by the user or an administrator (or both), and associated with the user, can be accessed to determine whether a particular contact in the original list should be assigned to the active list, or the inactive list. Some network connection associations can operate to override others. Thus, a user's family member that works for the same employer as the user may be included in the active list when the user connects to the WORK network, even though the HOMETOWN TELEPHONE network is still actively connected to the device, and all other members of the user's family are now included in the inactive list. The device can then operate to hide the inactive members of the original list from the user, and publish the presence of the user to the list of active contacts, the list inactive contacts, or both. Location data for mobile devices may be used along with personal rule sets to further refine group membership.

Embodiments of the invention can be implemented in a variety of architectural platforms, operating and server systems, devices, systems, and applications. Any particular architectural layout or implementation presented herein is thus provided for purposes of illustration and comprehension only, and is not intended to limit the various embodiments.

FIG. 1 is a flow diagram illustrating network-aware communication methods 111 according to various embodiments of the invention. The methods 111 are implemented in a machine-accessible and readable medium. The network-aware communications methods 111 are operational over processes within and among networks. The networks may be wired, wireless, or a combination of wired and wireless. The methods 111 may be implemented as instructions, which when accessed by a machine, perform the processing depicted in FIG. 1. Given this context, network-aware communication is now discussed with reference to FIG. 1.

In some embodiments, the method 111 may begin at block 125 with detecting a device connecting to a network. If no new connection is determined at block 125, then the method 111 may loop on block 125 until a new connection is detected.

Once a new connection has been made, as determined at block 125, the method 111 may include determining the identity of the network at block 129. For example, the network identity may comprise the name of a network, such as the name of a company intranet, the name of a cellular telephone network, or some other network name. In addition, or as an alternative, a network identity may comprise the network type (e.g., wired, wireless, IEEE 802.11g), a network name associated with a range of network addresses (e.g., a named office network and addresses within a range of 101.101.101.001 to 101.101.101.199), and/or gateway information (e.g., the gateway having a fixed uniform resource locator address of 101.101.101.001).

Once the network has been identified at block 129, the method 111 may include, at block 133, publishing a status indication to a list of active contacts selected from an original list of contacts. Publication may take the form of transmitting a message to the active list, or writing the status indication (e.g., a flag) to elements of a table that includes the active list, or tagging members of the active list, among others. The list of active contacts may be based on the identity of the network and a personal rule set associated with a user of the device. The status indication may comprise a wide variety of states, such as off-line, busy, at home, or at work, among others. The status indication may also comprise a combination of states, such as at-home and at work, or at work and off-line, etc.

Personal rule sets may be configured by a network administrator, a user of the device, or both. A personal rule set may have individual rules that overlap network connections, and that interact in a hierarchy. Thus, for example, a personal rule set may comprise a set of one or more rules defining the relationship between members of the list of active contacts and the identity of the network as a named network or a network type. For example, selected members of an original contact list may be tagged with the name of a network, a network type, and/or some other designation (e.g., "office" or "family" or "friend"). Such tags may operate to include the tagged members in the active list when the associated device connects to a network of the tagged name/type (direct association), or a network that is associated with a particular group tag (indirect association). Thus, the personal rule set may comprise a set of one or more rules defining a relationship between members of the list of active contacts and tag information.

Many variations are possible. For example, a personal rule set may comprise a set of one or more rules defining a grouping relationship between members of the list of active contacts, with the grouping relationship established based on content in fields of an address book. Thus, members of the active group in a list of contacts can be designated by using one of the fields in an address book, such as city, state, zip code, or telephone exchange, etc. In another example, the personal rule set may comprise a set of one or more rules defining a relationship between members of the list of active contacts and grouping information included in an instant messaging address book.

Some rules to establish the list of active contacts within the personal rule set can take precedence over others, such as a EUROPE network contact list taking precedence over an OFFICE contact list. In this case, the personal rule set may comprises one or more rules having a hierarchy of precedence, so that in the preceding example, the active list of contacts for a user connected to both an OFFICE network and the EUROPE network may drop members that are not tagged with both the EUROPE and OFFICE network designations.

Contacts that are inactive may be rendered invisible to the user of the device. Thus, the method 111 may go on to block 137 with hiding the identification of members of the list of inactive contacts included in the original list, and not included in the list of active contacts.

At various times, members of the inactive contact list may attempt to contact the user even when they are hidden from display to the user. Thus, if the method 111 operates to determine that an attempt has been made to communicate with the user's device by an inactive contact at block 141, several things may occur.

For example, the method 111 may include receiving attempted communication from an inactive contact in the original list that is not included in the list of active contacts, and responding to the attempted communication with an automated status message at block 145. In this way, an automated response can be made to inactive contacts that make an attempt to communicate with the user, even when they are not included in the active list.

Attempts by inactive contacts to communicate can also simply be rejected. Thus, in some embodiments, the activity at block 145 may include receiving attempted communication from a contact in the original list that is not included in the list of active contacts, and rejecting the attempted communication.

The user may optionally permit an audio and/or visual warning to be generated responsive to attempted communication by selected contacts that may not be on the active list, such as a child that may need urgent assistance. Thus, the method 111 may include, at block 149, generating an audio alert, a visual alert, or both, when an inactive contact in the original list that is not included in the list of active contacts attempts to establish communication with the device. Other embodiments may be realized.

Figure 2:
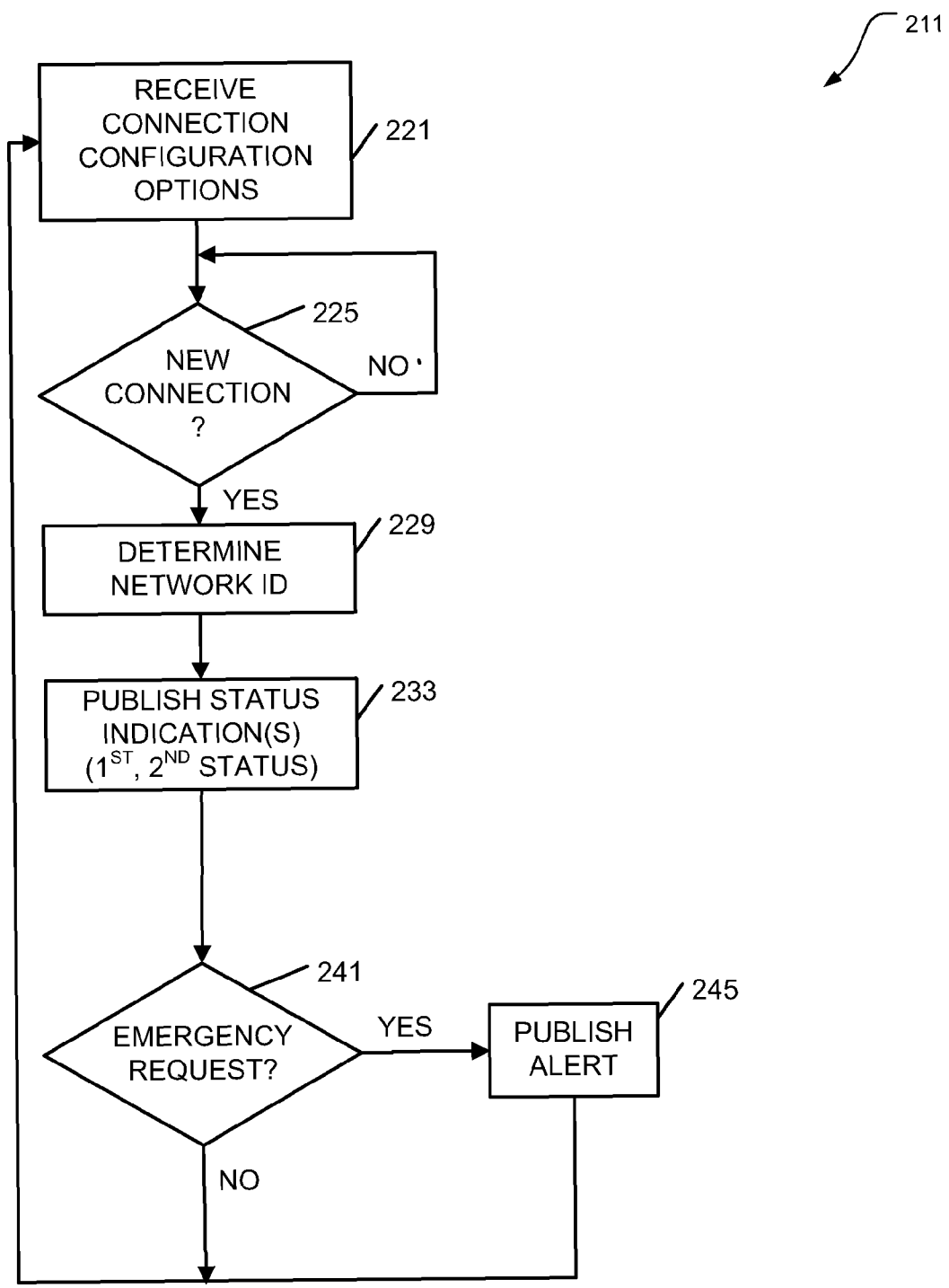
FIG. 2 is another flow diagram illustrating network-aware communication methods according to various embodiments of the invention.

For example, FIG. 2 is another flow diagram illustrating network-aware communication methods 211 according to various embodiments of the invention. In this case, network-aware communication is described with additional emphasis on a variety of publication options. The methods 211 are implemented in a machine-accessible and readable medium. The network-aware communication methods 211 are operational over processes within and among networks. The networks may be wired, wireless, or a combination of wired and wireless. The methods 211 may be implemented as instructions, which when accessed by a machine, perform the processing depicted in FIG. 2.

To implement network-aware communications, a method 211 may begin at block 221 with receiving one or more connection configuration options to determine network change communication operations. Thus, as connections to new networks are made (e.g., going from home to office, or from the office back home), the type of communications permitted by the device may be regulated. In this way, network change rules, perhaps comprising part of the personal rule set, may include provisions for immediately halting chat communications with friends when a connection is made to the user's work network, for example.

The method 211 may continue on to looping at block 225, to detect a device connecting to a network. The method 211 may proceed to include determining the identity of the network at block 229. The activities at blocks 225 and 229 may be similar to or identical to the activities described for blocks 125 and 129 in FIG. 1, respectively.

Turning now to FIG. 2, it can be seen that the method 211 may include, at block 233, publishing a status indication to at least one of a list of active contacts or a list of inactive contacts. The list of active contacts may be selected from an original list of contacts and based on the identity of the network and a personal rule set associated with a user of the device. The list of inactive contacts may be included in the original list and not included in the list of active contacts.

Publication at block 233 may include publishing the status indication as a first status and a second status different from the first status, the first status published to the list of active contacts, and the second status published to the list of inactive contacts. In this way, one type of status is published to the active list, and another type of status is published to the inactive list. For example, the first status might comprise one of at work or at home, and the second status might comprise one of busy or off-line. As noted previously, many variations are possible.

The method 211 may go on to block 241 with determining whether an attempt at requesting emergency services has been made. Thus, the method 211 may include receiving a request at the device for emergency services at block 241, and publishing an alert message on the device responsive to the request at block 245. In this way, an emergency message request can result in alerting the user as an exception to the conditions set in the personal rule set filter.

The methods described herein do not have to be executed in the order described, or in any particular order. Moreover, various activities described with respect to the methods identified herein can be executed in repetitive, serial, or parallel fashion. The individual activities of the methods shown in FIGS. 1 and 2 can also be combined with each other and/or substituted, one for another, in various ways. Information, including parameters, commands, operands, and other data, can be sent and received in the form of one or more carrier waves. Many other embodiments may be realized.

Figure 3:
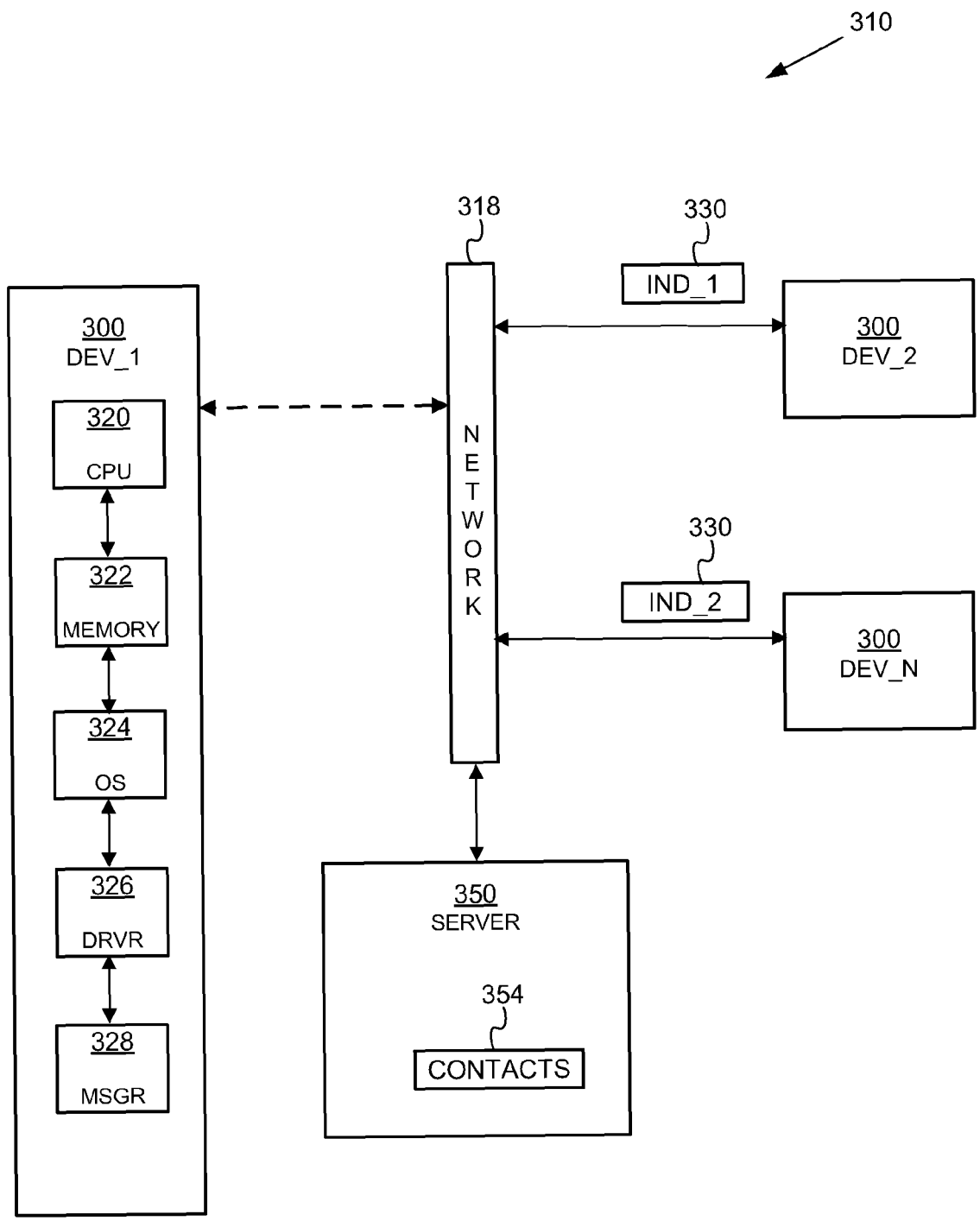
FIG. 3 is a block diagram of a network-aware communications apparatus and system according to various embodiments of the invention.

For example, FIG. 3 is a block diagram of a network-aware communications apparatus 300 and system 310 according to various embodiments of the invention. The network-aware communications apparatus 300 may be implemented in a machine-accessible and readable medium and is operational over one or more networks 318. The networks 318 may be wired, wireless, or a combination of wired and wireless. The network-aware communications apparatus 300 implements, among other things, the processing associated with the network-aware communication methods 111 and 211 of FIGS. 1 and 2, respectively. Modules may comprise hardware, software, and firmware, or any combination of these.

In some embodiments, an apparatus 300 used to implement network-aware communications may comprise a device DEV_1, and one or more device drivers 326 and/or operating systems 324 to detect the device DEV_1 connecting to a network 318, and to determine the identity of the network 318. The apparatus 300 may further comprise one or more processors 320 to publish a status indication 330 associated with a user of the device to at least one of a list of active contacts and a list of inactive contacts. The lists of active and inactive contacts may be determined as described previously. For example, the apparatus 300 might comprise a laptop computer, a PDA, or a cellular phone, among others. The apparatus 300 may further include a memory 322 to store the original list of contacts and the personal rule set.

The apparatus 300 may be used for instant messaging. Thus, the apparatus 300 may comprise a messenger module 328 to receive the active list, perhaps prior to publication. The messenger module 328 or the memory 322 may include a personalization rules engine to permit the user to add/modify/delete rules, as desired. Additional embodiments may be realized.

For example, a network-aware communications system 310 may comprise multiple apparatus 300, such as a first device DEV_1 and a second device DEV_2. The second device DEV_2 may be used to receive the status indication IND_1 from the first device DEV_1, such as when the content of the status indication IND_1 is based on identifying a user of the second device as a member of the active list, or the inactive list, as determined by the personal rule set associated with the first device DEV_1.

Reciprocal operations are also possible, such that the second device DEV_2 can send indications 330 to the first device DEV_1. Another device DEV_N that forms part of the system 310 may also publish indications IND_2 to other devices DEV_1, DEV_2 coupled to the network 318 when new connections are made. In this way, a system 310 may include multiple laptops, or a client and a server, etc. For example, if an instant messaging system 310 is implemented, multiple apparatus 300 that form a part of the system 310 may each include a messenger module 328.

The original list of contacts, as well as the active contact list and/or inactive contact list can be stored in the memory 322 of the apparatus 300. The various lists of contacts can also be stored remotely. Thus, in some embodiments, the system 310 comprises a server 350 to store the original list of contacts 354. The server 350 may be used to store the original list of contacts 354 before or after the active list is established.

Implementing the apparatus, systems, and methods described herein may thus provide users the ability to automatically and selectively notify various groups of contacts with respect to their presence on a network, perhaps combined with their physical presence at some location that is associated with an identified network. In addition, attempted communication by inactive contacts, perhaps as part of an emergency request, can be selectively announced. Increased productivity for users that implement the various embodiments may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
    a device;
    at least one of a device driver or an operating system to detect the device connecting to a network, and to determine an identity of the network responsive to the detecting, the identity of the network comprising at least one of a network name, a network type, a network address range name or gateway information associated with the network;
    a processor to publish a first status indication associated with a user of the device to one of a list of active contacts and a list of inactive contacts, the processor configured to automatically compose the list of active contacts by selecting at least one contact from an original list of contacts based on the identity of the network and a personal rule set associated with the user, the list of inactive contacts included in the original list and not included in the list of active contacts; and publishing a second status indication associated with the user of the device to the other one of the list of active contacts or the list of inactive contacts, the first status indication different from the second status indication.

2. The apparatus of claim 1, further comprising:
a messenger module to receive the active list.

3. The apparatus of claim 1, further comprising:
a memory to store the original list of contacts and the personal rule set.

4. The apparatus of claim 1, wherein the device is to connect to another network while connecting to the network, wherein the processor is configured to assign the at least one contact to the list of inactive contacts for the other network using the personal rule set.

5. The apparatus of claim 1, wherein the device is to connect to another network while connecting to the network, wherein the processor is configured to assign the at least one contact to the list of active contacts for the other network using the personal rule set.

6. The apparatus of claim 1, wherein the processor is configured to tag the at least one contact with the identity of the network.

7. A system, comprising:
a first device including at least one of a device driver or an operating system to detect the device connecting to a network and to determine an identity of the network responsive to the detecting, the identity of the network comprising at least one of a network name, a network type, a network address range name or gateway information associated with the network, and a processor to publish a first status indication associated with a user of the first device to one of a list of active contacts and a list of inactive contacts, the processor configured to automatically compose the list of active contacts by selecting at least one contact from an original list of contacts based on the identity of the network and a personal rule set associated with the user, the list of inactive contacts included in the original list and not included in the list of active contacts, the processor to publish a second status indication associated with the user of the first device to the other one of the list of active contacts or the list of inactive contacts, the first status indication different from the second status indication; and
a second device to receive the first status indication from the first device.

8. The system of claim 7, further comprising:
a server to store the original list of contacts.

9. The system of claim 7, wherein the first and second devices each comprise a messenger module.

10. A computer-implemented method, comprising:
detecting a device connecting to a network;
determining an identity of the network responsive to the detecting, the identity of the network comprising at least one of a network name, a network type, a network address range name or gateway information associated with the network;
publishing a first status indication associated with a user of the device to a list of active contacts, the publishing including automatically composing the list of active contacts by selecting at least one contact from an original list of contacts based on the identity of the network and a personal rule set associated with the user of the device; and
publishing a second status indication associated with the user of the device to a list of inactive contacts, the first status indication different from the second status indication.

11. The method of claim 10, comprising:
hiding identification of members of a list of inactive contacts included in the original list, and not included in the list of active contacts.

12. The method of claim 10, comprising:
generating at least one of an audio alert or a visual alert when an inactive contact in the original list that is not included in the list of active contacts attempts to establish communication with the device.

13. The method of claim 10, wherein the personal rule set comprises:
a set of one or more rules defining a relationship between members of the list of active contacts and the identity of the network as at least one of a named network or a network type.

14. The method of claim 10, wherein the personal rule set comprises:
a set of one or more rules defining a grouping relationship between members of the list of active contacts, the grouping relationship established based on content in fields of an address book.

15. The method of claim 10, wherein the personal rule set comprises:
a set of one or more rules defining a relationship between members of the list of active contacts and tag information.

16. The method of claim 10, wherein the personal rule set comprises:
one or more rules having a hierarchy of precedence.

17. The method of claim 10, wherein the network identity comprises an identity of a cellular telephone network.

18. The method of claim 10, wherein network identity comprises a name of a network associated with a range of uniform resource locator addresses.

19. The method of claim 10, comprising:
receiving attempted communication from an inactive contact in the original list that is not included in the list of active contacts; and
responding to the attempted communication with an automated status message.

20. The method of claim 10, comprising:
receiving attempted communication from a contact in the original list that is not included in the list of active contacts; and
rejecting the attempted communication.

21. A computer-implemented method, comprising:
detecting a device connecting to a network;
determining an identity of the network responsive to the detecting, the identity of the network comprising at least one of a network name, a network type, a network address range name or gateway information associated with the network;
publishing a first status indication associated with a user of the device to one of a list of active contacts or a list of inactive contacts, the publishing including automatically composing the list of active contacts by selecting at least one contact from an original list of contacts based on the identity of the network and a personal rule set associated with the user of the device, the list of inactive contacts included in the original list and not included in the list of active contacts; and publishing a second status indication associated with the user of the device to the other one of the list of active contacts or the list of inactive contacts, the first status indication different from the second status indication.

22. The method of claim 21, wherein the status indication comprises at least one of off-line, busy, at home, or at work.

23. The method of claim 21, wherein the first status indication is one of at work or at home, and the second status indication is one of busy or off-line.

24. The method of claim 21, wherein the personal rule set comprises:

a set of one or more rules defining a relationship between members of the list of active contacts and grouping information included in an instant messaging address book.

25. The method of claim 21, comprising:

receiving, at the device a request for emergency services from a contact in the list of inactive contacts; and publishing an alert message on the device responsive to the request.

26. The method of claim 21, comprising:

receiving a connection configuration option to determine network change communication operations.

\* \* \* \* \*

UNITED STATES PATENT AND TRADEMARK OFFICE
CERTIFICATE OF CORRECTION

| | | |
|---|---|---|
| PATENT NO. | : 8,224,900 B2 | Page 1 of 1 |
| APPLICATION NO. | : 12/367960 | |
| DATED | : July 17, 2012 | |
| INVENTOR(S) | : Dutta et al. | |

It is certified that error appears in the above-identified patent and that said Letters Patent is hereby corrected as shown below:

In column 10, line 6, in claim 25, delete "device" and insert --device,--, therefor Signed and Sealed this
Eleventh Day of September, 2012

David J. Kappos
*Director of the United States Patent and Trademark Office*